(12) United States Patent
Kitada et al.

(10) Patent No.: US 10,120,477 B2
(45) Date of Patent: Nov. 6, 2018

(54) PUSH AMOUNT DETECTING SENSOR AND TOUCH INPUT DEVICE

(71) Applicant: Murata Manufacturing Co., Ltd., Nagapkakyo-shi, Kyoto (JP)

(72) Inventors: Hiroaki Kitada, Nagaokakyo (JP); Toru Ishii, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 77 days.

(21) Appl. No.: 14/671,441

(22) Filed: Mar. 27, 2015

(65) Prior Publication Data

US 2015/0199061 A1    Jul. 16, 2015

Related U.S. Application Data

(63) Continuation of application No. PCT/JP2013/075254, filed on Sep. 19, 2013.

(30) Foreign Application Priority Data

Sep. 28, 2012 (JP) .................................. 2012-215404

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0418* (2013.01); *G06F 2203/04105* (2013.01)

(58) Field of Classification Search
CPC ...... G06F 3/0414; G06F 3/0418; G06F 3/044; G06F 2203/04105; G06F 3/041; G06F 3/0416
See application file for complete search history.

(56) References Cited

U.S. PATENT DOCUMENTS 3,975,592 A * 8/1976 Carvey .................. G06F 3/044
178/20.01
6,204,839 B1 * 3/2001 Mato, Jr. ................ G06F 1/1616
341/22

(Continued)

FOREIGN PATENT DOCUMENTS

CN       101515202 A       8/2009
JP       11-271172 A       10/1999
(Continued)

OTHER PUBLICATIONS

International Search Report dated Nov. 26, 2013, International Application No. PCT/JP2013/075254.

*Primary Examiner* — Patrick Edouard
*Assistant Examiner* — Joseph Fox
(74) *Attorney, Agent, or Firm* — Arent Fox LLP

(57) ABSTRACT

A touch input device includes a touch panel, a push amount calculating unit and a touch detection signal generating unit. The touch panel includes piezoelectric and electrostatic sensors. The piezoelectric sensor outputs to the push amount calculating unit a push signal corresponding to a displacement amount obtained by pushing an operation surface. The electrostatic sensor outputs touch signals, corresponding to a touch and a non-touch, to a touch detection signal generating unit. The touch detection signal generating unit outputs to the push amount calculating unit the touch detection signals binarized according to the touch and non-touch state. The push amount calculating unit integrates differences between push signals and a reference potential during a touch state, generates a push amount detection signal and outputs the push amount detection signal. This unit resets a reference potential during a period in which a touch detection signal indicating a non-touch state is inputted.

19 Claims, 2 Drawing Sheets

(56) References Cited

U.S. PATENT DOCUMENTS

| | | |
|---|---|---|
| 2006/0284856 A1 | 12/2006 | Soss |
| 2006/0293864 A1 | 12/2006 | Soss |
| 2007/0091013 A1 | 4/2007 | Pak et al. |
| 2009/0207147 A1* | 8/2009 | Perrot .................. G06F 1/3215 345/173 |
| 2009/0315851 A1* | 12/2009 | Hotelling ................ G06F 3/044 345/173 |
| 2010/0156852 A1* | 6/2010 | Chu ...................... G06F 3/0418 345/176 |
| 2012/0038583 A1* | 2/2012 | Westhues .............. G06F 3/0412 345/174 |
| 2012/0050219 A1* | 3/2012 | Lee ........................ G06F 3/044 345/174 |
| 2012/0075226 A1* | 3/2012 | Andoh .................... G06F 3/046 345/173 |
| 2012/0105358 A1 | 5/2012 | Momeyer et al. |
| 2012/0274599 A1* | 11/2012 | Schediwy .............. G06F 3/016 345/174 |
| 2012/0299866 A1* | 11/2012 | Pao ........................ G06F 3/044 345/174 |
| 2015/0212648 A1* | 7/2015 | Moravcik ............. G06F 3/0418 345/174 |

FOREIGN PATENT DOCUMENTS

| | | |
|---|---|---|
| JP | 2000-283869 A | 10/2000 |
| JP | 2007-122733 A | 5/2007 |
| JP | 2010-108490 A | 6/2010 |
| WO | WO 2010/143528 A1 | 3/2010 |
| WO | WO 2010/038466 A1 | 4/2010 |

* cited by examiner

PUSH AMOUNT DETECTING SENSOR AND TOUCH INPUT DEVICE

CROSS REFERENCE TO RELATED APPLICATIONS

The present application is a continuation of PCT/JP2013/075254 filed Sep. 19, 2013, which claims priority to Japanese Patent Application No. 2012-215404, filed Sep. 28, 2012, the entire contents of each of which are incorporated herein by reference.

FIELD OF THE INVENTION

The present invention relates to a touch input device which detects a push amount of a finger or the like upon an operation.

BACKGROUND OF THE INVENTION

Conventionally, various types of sensors which detect push amounts are devised as techniques used for a touch input device which can detect a push amount. For example, Patent Literature 1 discloses a sensor which includes a pressure sensing unit and a sensing result converting unit.

The pressure sensing unit includes a piezoelectric body of a flat shape, and outputs a signal of an amplitude level corresponding to a displacement amount of a piezoelectric body. The sensing result converting unit integrates output signals of the pressure sensing unit. This integration arithmetic operation value corresponds to the push amount. Thus, the sensor of Patent Literature 1 senses the push amount.

PTL 1: Japanese Patent Application Laid-Open No. 2000-283869

However, in the piezoelectric body, a signal level of a displacement amount obtained when a pressing force is applied, and a signal level of a displacement amount obtained when the pressing force is released are different. Hence, when signal levels are integrated as in the sensor according to Patent Literature 1, a reference potential differs before and after one pushing operation. Hence, according to the configuration of the sensor according to Patent Literature 1, the reference potential differs per pushing operation.

In this regard, the push amount is calculated from an integration value of differences between signals levels corresponding to displacement amounts, and the reference potential. Therefore, when the reference potential changes, a relationship between the signal level and the push amount changes. That is, even when the push amount is the same every time, the difference between a signal level and the reference potential differs. Hence, according to the configuration of the sensor according to Patent Literature 1, precision to measure the push amount lowers.

Particularly when the pushing operation is repeated, the relationship between the reference potential and the pressing force (push amount) loses touch with each other. Therefore, the measurement precision further lowers.

SUMMARY OF THE INVENTION

An object of the present invention is to provide a push amount detecting sensor which can maintain high precision to measure a push amount and a touch input device which uses the push amount detecting sensor.

A push amount detecting sensor according to the present invention includes: a piezoelectric sensor which outputs a push signal corresponding to a displacement amount obtained when an operation surface is pushed; a touch detecting sensor which detects a touch on the operation surface of the piezoelectric sensor, and outputs a touch detection signal; and a push amount calculating unit which integrates a difference between the push signal and a reference potential, and outputs a push amount detection signal based on an integration result. The push amount calculating unit of the push amount detecting sensor switches between processing of the integration and processing of resetting the reference potential according to a state change of the touch detection signal.

According to this configuration, the processing of integrating the push signal and the processing of resetting the reference potential are switched according to a touch state, i.e., an operation state. More specifically, the integration processing is performed when a touch is detected, and the processing of resetting the reference potential is executed when a touch is not detected. Thus, the reference potential is maintained at a fixed value without depending on the number of times of operations.

Further, preferentially, the push amount detecting sensor according to the present invention is configured as follows. The touch detecting sensor outputs the touch detection signal which take binary values binarized according to two states of a touch and a non-touch on the operation surface. The push amount calculating unit performs the processing of integrating one of the binary values, and the processing of resetting the other one of the binary values.

This configuration indicates a specific mode of the touch detection signal for switching between the integration processing and the reset processing. Thus, by binarizing the touch detection signal and giving the binary value to the push amount calculating unit, the push amount calculating unit can easily switch between the integration processing and the reset processing.

Further, preferentially, the push amount detecting sensor according to the present invention may be configured as follows. The push amount calculating unit is an integration circuit with a bypass circuit, and employs a circuit configuration which enables the bypass circuit in case of the one of the binary values and disenables the bypass circuit in case of another one of the binary values.

This configuration is a specific circuit configuration when the push amount calculating unit is realized by an analog electronic circuit.

Further, preferentially, the push amount detecting sensor according to the present invention may be configured as follows. The push amount calculating unit includes an operational amplifier in which an inversion input terminal receives an input of a push signal through a resistor, and in which non-inversion input terminal is given a reference potential, a capacitor which is connected in parallel between an output terminal and the inversion input terminal of the operational amplifier, and a series circuit of a switch element and a discharge resistor which is connected in parallel to the capacitor, and which is controlled to turn on and off according to the touch detection signal.

This configuration is a more specific circuit configuration when the push amount calculating unit is realized by an analog electronic circuit.

Further, preferentially, the push amount detecting sensor according to the present invention may be configured as follows. The touch detecting sensor includes an electrostatic sensor which outputs the touch signal corresponding to a position at which an electrostatic capacitance changes when the operation surface is touched, and a touch detection signal generating unit which generates from the touch signal a touch detection signal whose state changes according to the touch state. The push amount calculating unit and the touch detection signal generating unit are realized by a digital IC integrated as one chip.

This configuration indicates a specific mode when part of the push amount detecting sensor is integrated as a digital IC. Thus, by integrating the push amount detecting sensor as a digital IC, it is possible to make the push amount detecting sensor smaller.

Further, the present invention relates to a touch input device, and includes features that the present invention includes the push amount detecting sensor employing one of the above configurations, and outputs a touch detection signal together with a push amount detection signal.

According to this configuration, it is possible to maintain high precision to detect the push amount, and to realize the touch input device which can detect a touch position.

Further, preferentially, the touch input device according to the present invention is configured as follows. The push amount calculating unit includes a signal output selecting unit which stops an output of the touch detection signal when the push amount detection signal is less than a threshold, and enables an output of the touch detection signal when the push amount detection signal is the threshold or more.

According to this configuration, the touch detection signal is not outputted until the push amount detection signal reaches a predetermined level or more. Consequently, the touch detection signal is not outputted in a state where an operation is not performed such as a state where a finger approaches the operation surface or a state where the finger lightly touches the operation surface. Consequently, it is possible to prevent a touch from being detected (erroneously detected) in case of a state where an operation is not intentionally performed.

Further, preferentially, the touch input device according to the present invention is configured as follows. The touch detecting sensor includes an electrostatic sensor which outputs the touch signal corresponding to a position at which an electrostatic capacitance changes when the operation surface is touched, and a touch detection signal generating unit which generates from the touch signal a touch detection signal whose state changes according to the touch state, and outputs the touch detection signal to the push amount calculating unit. The push amount calculating unit and the touch detection signal generating unit are realized by a digital IC integrated as one chip.

This configuration indicates a specific mode when part of the touch input device is integrated as a digital IC. Thus, by integrating the touch input device as a digital IC, it is possible to make the touch input device smaller.

According to the present invention, it is possible to maintain high precision to detect a push amount.

DETAILED DESCRIPTION OF THE DRAWINGS

Figure 1:
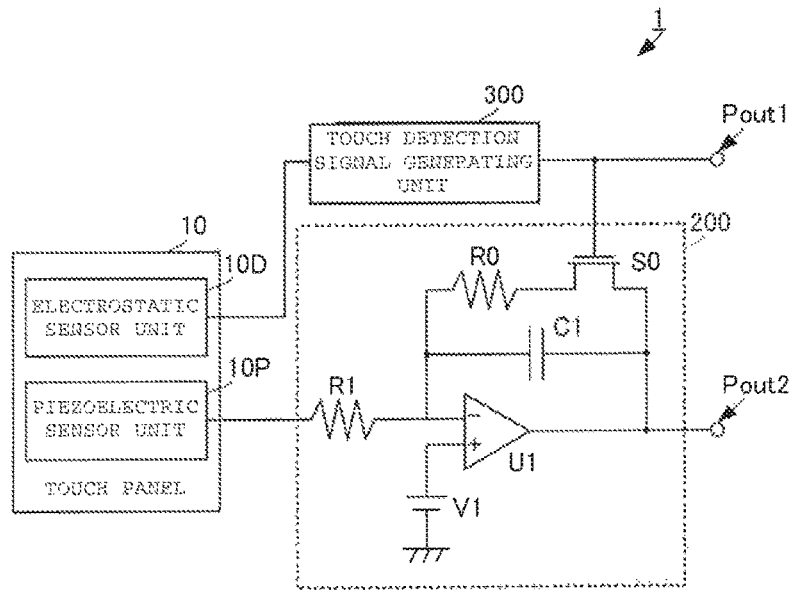
FIG. 1 is a block diagram of a touch input device according to a first embodiment of the present invention.

A touch input device according to the first embodiment of the present invention will be described with reference to the accompanying drawings. FIG. 1 is a block diagram of the touch input device according to the first embodiment of the present invention.

A touch input device 1 includes a touch panel 10, a push amount calculating unit 200 and a touch detection signal generating unit 300. The touch panel 10 includes a piezoelectric sensor 10P and an electrostatic sensor 10D. A block composed of the electrostatic sensor 10D and the touch detection signal generating unit 300 corresponds to a touch detecting sensor according to the present invention.

Although a specific structure example will be described later, the touch panel 10 has a flat shape and includes at least one of primary surfaces (flat surfaces) of flat surfaces as an operation surface which accepts an operator's operation.

The piezoelectric sensor 10P of the touch panel 10 is connected to the push amount calculating unit 200. The piezoelectric sensor 10P outputs to the push amount calculating unit 200 a push signal of a signal level corresponding to a displacement amount of a curve caused when the operation surface is pushed.

The electrostatic sensor 10D of the touch panel 10 is connected to the touch detection signal generating unit 300. The electrostatic sensor 10D outputs a touch signal corresponding to a change of an electrostatic capacitance which occurs when an operator's finger or the like touches the operation surface.

The touch detection signal generating unit 300 generates a touch detection signal from the touch signal. The touch detection signal is a signal which is binarized to High and Low. More specifically, the touch detection signal generating unit 300 sets a touch detection threshold to a signal level of the touch signal, and outputs a touch detection signal of a High state during a period in which a signal level equal to or more than the touch detection threshold is detected. The touch detection signal generating unit 300 outputs a touch detection signal of a Low state during a period in which the signal level equal to or more than the touch detection threshold is not detected.

The touch detection signal generating unit 300 outputs the touch detection signal to the push amount calculating unit 200 and a first output terminal Pout1. In this regard, the touch detection signal generating unit 300 only needs to output the touch detection signal to the push amount calculating unit 200, and outputs information related to a touch position together with the touch detection signal to the first output terminal Pout1.

The push amount calculating unit 200 includes an operational amplifier U1, a resistor R1, a capacitor C1, a discharge resistor R0 and a switch element S0. An inversion input terminal of the operational amplifier U1 is connected to the piezoelectric sensor 10P through the resistor R1. Hence, a push signal is inputted to the inversion input terminal of the operational amplifier U1 through the resistor R1. A reference potential V1 is applied to the non-inversion input terminal of the operational amplifier U1.

An output terminal of the operational amplifier U1 is connected to a second output terminal Pout2 of the touch input device 1. The capacitor C1 is connected between the inversion input terminal and the output terminal of the operational amplifier U1. The discharge resistor R0 and the switch element S0 are connected in series, and this series circuit is connected in parallel to the capacitor C1.

The switch element S0 is controlled to turn on and off according to High and Low of the touch detection signal. For example, the switch element S0 is placed in an on state when the touch detection signal is in a Low state, and is placed in an off state when the touch detection signal is in a High state. More specifically, the switch element S0 is realized by, for example, a normally on FET or the like.

Thus, the switch element S0 is controlled to turn on during a period in which the touch detection signal of the Low state is inputted, and is controlled to turn off during a period in which the touch detection signal of the High state is inputted. That is, the switch element S0 is controlled to turn on during a period in which a touch is not detected, and is controlled to turn off during a period in which a touch is detected.

In addition, when the normally on element is used for the switch element S0, the above touch detection signal taking a binary value only needs to be used. However, when a normally off element is used for the switch element S0, a binary state of the touch detection signal only needs to be inverted. That is, a touch detection signal which is placed in a Low state during a period in which a touch is detected, and which is placed in a High state during a period in which a touch is not detected only needs to be used.

By applying such a circuit configuration, an integration circuit is formed by the operational amplifier U1, the resistor R1 and the capacitor C1 in the push amount calculating unit 200 during a period in which the switch element S0 is in the off state. Hence, the push amount calculating unit 200 integrates differences between push signals and a reference potential, and outputs a push amount detection signal which is this integration result, to the second output terminal Pout2.

That is, the push amount calculating unit 200 integrates differences between push signals and the reference potential during a period in which a touch is detected. Further, the push amount calculating unit 200 outputs the push amount detection signal which is this integration result, to the second output terminal Pout2.

Meanwhile, when the switch element S0 is in the on state, a circuit configuration where the capacitor C1 and the discharge resistor R0 are connected in parallel is employed. Consequently, the push amount calculating unit 200 stops functioning as the integration circuit. Hence, the push amount calculating unit 200 outputs the push signal as is to the second output terminal Pout2. Further, the capacitor C1 and the discharge resistor R0 configure a closed loop circuit, so that electric charges accumulated in the capacitor C1 are discharged and consumed by the discharge resistor R0. Consequently, the potential of the output terminal Pout2 is reset to the reference potential.

That is, the push amount calculating unit 200 resets the potential of the second output terminal Pout2 to the reference potential during a period in which a touch is detected.

Figure 2:
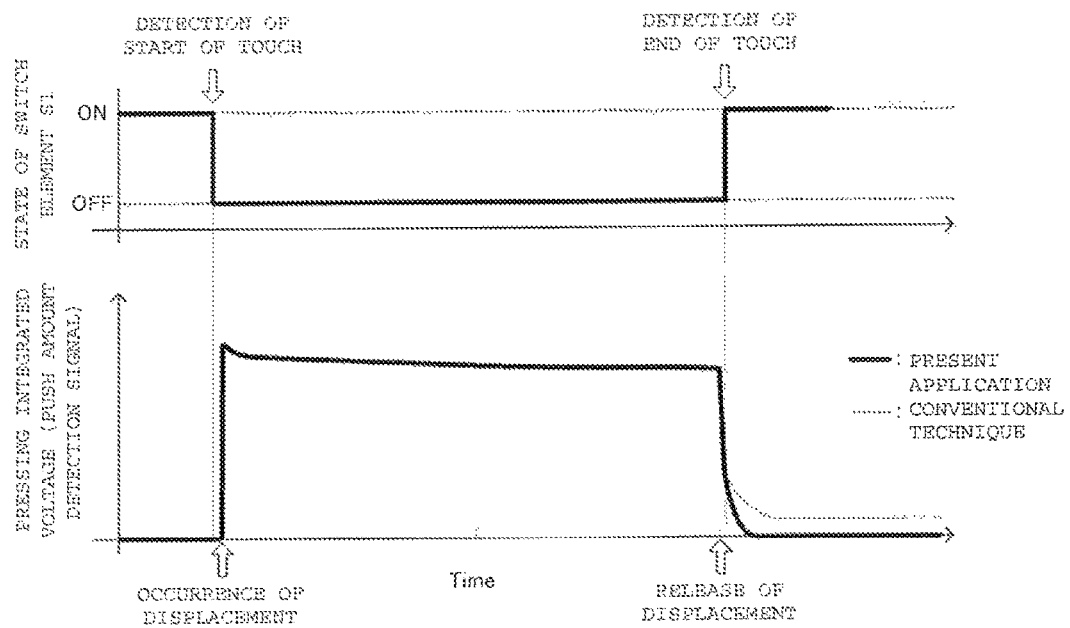
FIG. 2 illustrates waveform conceptual diagrams of push amount detection signals of the touch input device according to the first embodiment of the present invention and a conventional touch input device.

FIG. 2 illustrates waveform conceptual diagrams of push amount detection signals of the touch input device according to the first embodiment of the present invention, and a conventional touch input device. Solid lines in FIG. 2 indicate waveforms of push amount detection signals when a configuration of the embodiment is used, and wavy lines indicate waveforms of a push amount detection signal when a conventional configuration is used.

As illustrated in FIG. 2, by using the configuration according to the present embodiment, an integrated waveform corresponding to a push amount appears, and the reference potential before and after the pushing operation is the same.

Meanwhile, according to a conventional configuration, the reference potential changes before and after the pushing operation. In this regard, the push amount is determined according to a signal level of a push amount detection signal, and the signal level of the push amount detection signal is determined according to a difference between the push signal and the reference potential. Consequently, by stabilizing the reference potential as in the present embodiment, it is possible to precisely detect the push amount.

As described above, by employing the configuration according to the present embodiment, it is possible to maintain high precision to detect a push amount even when an operation (pushing operation) is repeated while outputting a push amount detection signal of a signal level corresponding to the push amount.

By the way, a specific configuration of the touch panel 10 has not been described in the above description. However, using the touch panel 10 configured as described below is preferable.

The touch panel 10 is formed by integrating the piezoelectric sensor 10P and the electrostatic sensor 10D using one piezoelectric film. More specifically, push amount detection electrodes and electrostatic capacitance detection electrodes are included in both of primary surfaces of the one piezoelectric film opposing to each other.

The piezoelectric film is formed as a flat film of a rectangular shape including a primary surface and a secondary surface opposing to each other. The piezoelectric film is formed by poly-L-lactide (PLLA).

The PLLA is a chiral polymer and a main chain adopts a helical structure. The PLLA is uniaxially stretched, and has piezoelectricity when molecules are oriented. A piezoelectric constant of the uniaxially stretched PLLA belongs to a group of a very high piezoelectric constant among polymers.

In addition, the stretch ratio is preferably about three to eight fold. Applying heat processing after stretching encourages crystallization of extended chain crystal of polylactic acid, so that the piezoelectric constant increases.

In addition, in case of biaxial stretching, it is possible to provide the same effect as that of uniaxial stretching by varying stretch ratios of respective axes. When, for example, a film is stretched eight times in a given direction as an X axis direction and is stretched two times in a Y axis direction orthogonal to this axis, it is possible to provide a substantially same effect of the piezoelectric constant as that obtained when a film is uniaxially stretched four times in the X axis direction. A film which is simply uniaxially stretched is likely to be split along a stretching axis direction, so that it is possible to increase the strength somewhat by biaxially stretching the film as described above.

Further, the PLLA produces the piezoelectricity upon processing of orienting molecules by way of stretching or the like, and does not require polling processing unlike other polymers such as PVDF or a piezoelectric ceramics. That is, the piezoelectricity of the PLLA which does not belong to a ferroelectric is not exhibited by ion polarization unlike ferroelectrics such as PVDF or PZT, and derives from a helical structure which is a characteristic structure of molecules. Therefore, the PLLA does not produce pyroelectricity produced in piezoelectric bodies of other ferroelectrics. Further, the piezoelectric constant of the PVDF and the like temporally fluctuates and remarkably lowers depending on cases. However, the piezoelectric constant of the PLLA is temporally very stable.

Further, the relative permittivity of the PLLA is about 2.5 and very low, and therefore when d is a piezoelectric constant and $\varepsilon^T$ is the permittivity, a piezoelectric output constant (=piezoelectric g constant, $g=d/\varepsilon^T$) takes a high value.

In this regard, the piezoelectric g constant of the PVDF of permittivity $\varepsilon_{33}T=13\times\varepsilon_0$, and a piezoelectric constant $d_{31}=25$ pC/N is $g_{31}=0.2172$ Vm/N in view of the above equation. Meanwhile, the piezoelectric g constant of the PLLA whose piezoelectric constant is $d_{14}=10$ pC/N is converted into $g_{31}$ and is calculated, $d_{14}=2\times d_{31}$ holds, then $d_{31}=5$ pC/N holds and the piezoelectric g constant takes $g_{31}=0.2258$ Vm/N. Hence, the PLLA of the piezoelectric constant $d_{14}$ 10 pC/N can make it possible to provide the same sufficient detection sensitivity of a push amount as that of PVDF. Further, inventors of the present invention have experimentally obtained PLLA of $d_{14}=15$ to 20 pC/N, so that, by using this PLLA, it is possible to a lot more sensitively detect a push amount.

In the primary surface of the piezoelectric film made of the PLLA having such characteristics, pluralities of first electrostatic capacitance detection electrodes and first push amount detection electrodes are formed in a predetermined pattern. For these pluralities of first electrostatic capacitance detection electrodes and first push amount detection electrodes, it is suitable to use one of organic electrodes whose main components are ITO, ZnO, silver nano wires and polythiophene, and organic electrodes whose main components are polyaniline. By using these materials, it is possible to form highly translucent electrode patterns. In addition, when translucency is not required, it is also possible to use electrodes formed using silver paste or metal electrodes formed by depositing, spattering or plating.

Further, in the secondary surface of the piezoelectric film, pluralities of second electrostatic capacitance detection electrodes and second push amount detection electrodes are formed in a predetermined pattern. For these pluralities of second electrostatic capacitance detection electrodes and second push amount detection electrodes, too, it is suitable to use one of organic electrodes whose mail components are ITO, ZnO, silver nano wires and polythiophene, and organic electrodes whose main components are polyaniline. By using these materials, it is possible to form highly translucent electrode patterns. In addition, when translucency is not required, it is also possible to use electrodes formed using silver paste or metal electrodes formed by depositing, spattering or plating.

The first electrostatic capacitance detection electrodes and the second electrostatic capacitance detection electrodes are formed in such a pattern that the first electrostatic capacitance detection electrodes and the second electrostatic capacitance detection electrodes partially oppose to each other through the piezoelectric film. The first push amount detection electrodes and the second electrostatic capacitance detection electrodes are also formed in such a pattern that the first push amount detection electrodes and the second electrostatic capacitance detection electrodes partially oppose to each other through the piezoelectric film.

The touch panel 10 adopting the above structure outputs the following touch signal and push signal.

When the operator's finger or the like touches the operation surface, an electrostatic capacitance changes between the first electrostatic capacitance detection electrodes and the second electrostatic capacitance detection electrodes according to a touched position, and a touch signal corresponding to this electrostatic capacitance is outputted. Thus, according to the above configuration, the piezoelectric film, and the first and second electrostatic capacitance detection electrodes arranged to sandwich the piezoelectric film make up the electrostatic sensor 10D.

When the operator's finger or the like pushes the operation surface, the piezoelectric film is curved according to a push amount (pressing force) and is displaced. The piezoelectric film produces electric charges according to this displacement amount. Thus, a potential difference is produced between the first push amount detection electrodes and the second electrostatic capacitance detection electrodes, and a push signal is generated by this potential difference and outputted. Thus, according to the above configuration, the piezoelectric film, and the first and second push amount detection electrodes arranged to sandwich the piezoelectric film make up the piezoelectric sensor 10P.

Thus, by using the configuration according to the present embodiment, it is possible to make up the piezoelectric sensor 10P and the electrostatic sensor 10D based on a single piezoelectric film, and make the touch panel 10 thinner. Consequently, it is possible to realize a smaller and a thinner touch input device as a whole.

Figure 3:
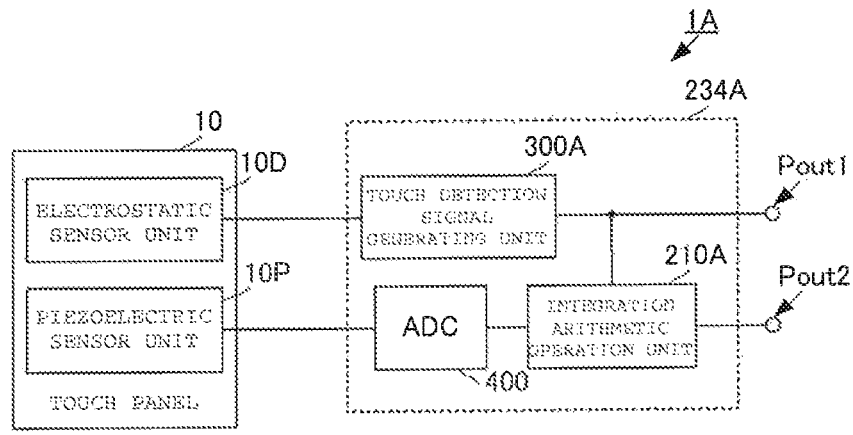
FIG. 3 is a block diagram of a touch input device according to a second embodiment of the present invention.

Next, a touch input device according to the second embodiment will be described with reference to the accompanying drawings. FIG. 3 is a block diagram of the touch input device according to the second embodiment of the present invention.

A touch input device 1A according to the present embodiment differs from a touch input device 1 described in the first embodiment in integrating a push amount calculating unit and a touch detection signal generating unit as a digital IC, and the configuration of a touch panel 10 is the same. Hence, only differences from the touch input device 1 according to the first embodiment will be more specifically described.

The touch input device 1A includes a touch panel 10 and a digital IC 234A. The digital IC 234A includes an ADC 400, an integration arithmetic operation unit 210A and a touch detection signal generating unit 300A.

The ADC 400 digital/analog-converts a push signal from a piezoelectric sensor 10P, and outputs the push signal to the integration arithmetic operation unit 210A.

Similar to a touch detection signal generating unit 300 according to the first embodiment, the touch detection signal generating unit 300A generates a binarized touch detection signal from a touch signal from an electrostatic sensor 10D, and outputs the touch detection signal to a first output terminal Pout1 and the integration arithmetic operation unit 210A.

The integration arithmetic operation unit 210A performs an integration arithmetic operation on a digitized push signal during a period in which the touch detection signal indicating a state where a touch is detected is inputted, and generates a push amount detection signal. The integration arithmetic operation unit 210A outputs this push amount detection signal to the second output terminal Pout2.

The integration arithmetic operation unit 210A resets the second output terminal Pout2 to a reference potential during a period in which a touch detection signal indicating that a touch is not detected is inputted.

Similar to the above first embodiment, even this configuration can maintain high precision to detect the push amount. Further, by integrating the touch detection signal generating unit and the push amount calculating unit as a digital IC, it is possible to make the touch detection signal generating unit and the push amount calculating unit smaller and to make the touch input device smaller.

Figure 4:
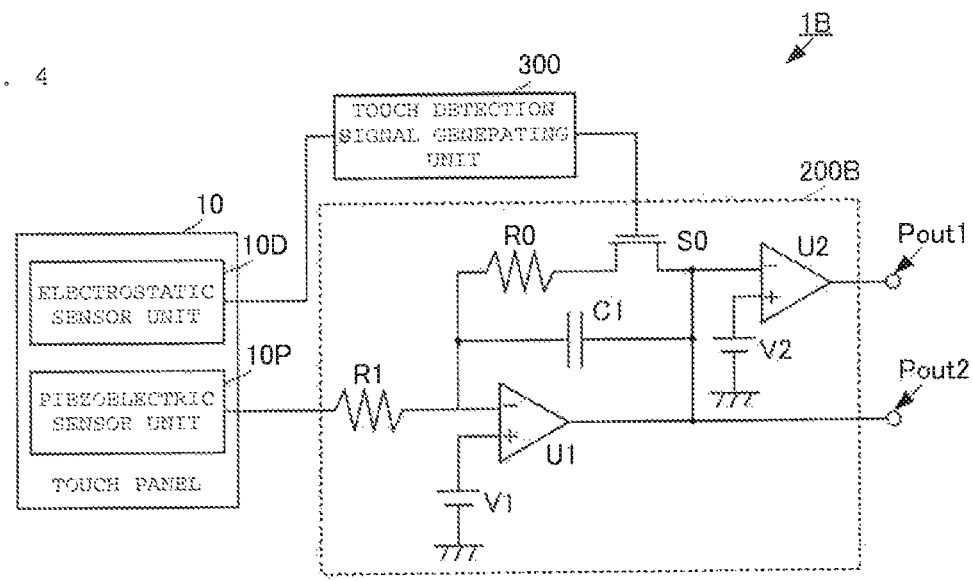
FIG. 4 is a block diagram of a touch input device according to a third embodiment of the present invention.

Next, a touch input device according to the third embodiment will be described with reference to the accompanying drawings. FIG. 4 is a block diagram of the touch input device according to the third embodiment of the present invention.

A touch input device 1B according to the present embodiment differs from a touch input device 1 according to the first embodiment in a configuration of a push amount calculating unit 200B. Hence, only differences from the touch input device 1 according to the first embodiment will be more specifically described.

A touch detection signal generating unit 300 outputs a touch detection signal to only a switch element S0.

An output terminal of an operational amplifier U1 is connected to an inversion input terminal of a comparator U2. A selected reference potential V2 is applied to the non-inversion input terminal of the comparator U2. An output terminal of the comparator U2 is connected to a first output terminal Pout1.

When a signal level of a push amount detection signal is the selected reference potential V2 or more, the comparator U2 outputs a determined touch detection signal having a predetermined first signal level (e.g. High level) to the first output terminal Pout1. When the signal level of the push amount detection signal is less than the selected reference potential V2, the comparator U2 outputs a determined touch detection signal having a predetermined second signal level (e.g. Low level) to the first output terminal Pout1. This comparator U2 corresponds to a "signal output selecting unit" of the present invention.

According to this configuration, a determined touch detection signal indicating a touch state is not outputted until the push amount detection signal reaches a predetermined signal level or more. Consequently, it is possible to prevent an operation input from being erroneously detected in, for example, a state where an operator unnecessarily places the finger or the like close to an operation surface or a state where the operator does not push the operation surface while lightly placing the finger or the like in contact with the operation surface. Consequently, it is possible to more reliably detect a touch.

Figure 5:
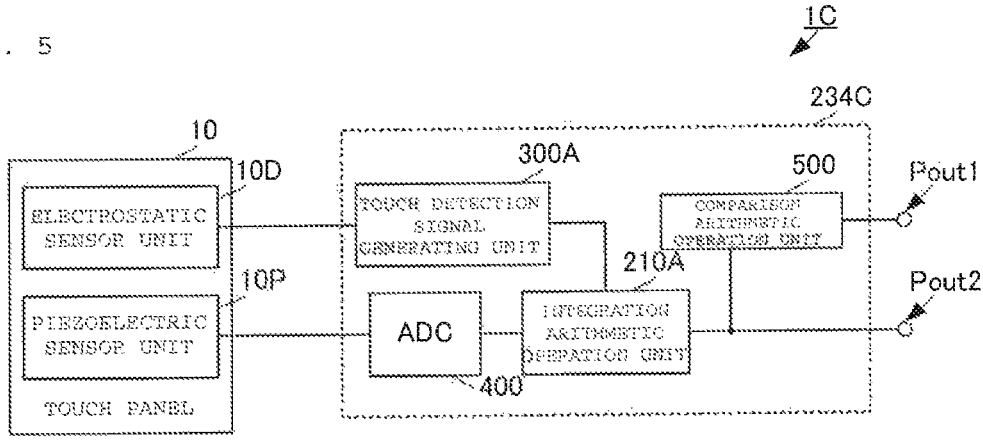
FIG. 5 is a block diagram of a touch input device according to a fourth embodiment of the present invention.

Next, a touch input device according to the fourth embodiment will be described with reference to the accompanying drawings. FIG. 5 is a block diagram of the touch input device according to the fourth embodiment of the present invention.

A touch input device 1C according to the present embodiment differs from a touch input device 1B described in the third embodiment in integrating a push amount calculating unit, a touch detection signal generating unit and a comparator as a digital IC, and the configuration of a touch panel 10 is the same. Hence, only differences from the touch input device 1B according to the third embodiment will be more specifically described.

The touch input device 1C includes the touch panel 10 and a digital IC 234C. The digital IC 234C includes an ADC 400, an integration arithmetic operation unit 210A and a touch detection signal generating unit 300A.

The ADC 400 digital/analog-converts a push signal from a piezoelectric sensor 10P, and outputs the push signal to the integration arithmetic operation unit 210A.

Similar to a touch detection signal generating unit 300 according to the first embodiment, the touch detection signal generating unit 300A generates a binarized touch detection signal from a touch signal from an electrostatic sensor 10D, and outputs the touch detection signal to the integration arithmetic operation unit 210A.

The integration arithmetic operation unit 210A performs an integration arithmetic operation on a digitized push signal during a period in which the touch detection signal indicating a state where a touch is detected is inputted, and generates a push amount detection signal. The integration arithmetic operation unit 210A outputs this push amount detection signal to a second output terminal Pout2 and a comparison arithmetic operation unit 500.

When a signal level of a push amount detection signal is the selected reference potential or more, the comparison arithmetic operation unit 500 outputs a determined touch detection signal indicating a touch state to a first output terminal Pout1. When a signal level of a push amount detection signal is less than the selected reference potential, the comparison arithmetic operation unit 500 outputs a determined touch detection signal indicating a non-touch state to the first output terminal Pout1.

Similar to the above third embodiment, even this configuration can maintain high precision to detect the push amount. Further, by integrating the touch detection signal generating unit, the push amount calculating unit and the comparator as a digital IC, it is possible to make the touch detection signal generating unit, the push amount calculating unit and the comparator smaller and make the touch input device smaller.

In addition, an example where the touch input device outputs both of a touch detection signal and a push amount detection signal has been described in each of the above embodiments. However, the touch input device may output only a push amount detection signal. In this case, it is possible to realize a push amount detecting sensor.

Further, an example where the piezoelectric sensor 10P and an electrostatic sensor 10D are formed based on a single piezoelectric film has been described above. However, a structure in which the piezoelectric sensor 10P and the electrostatic sensor 10D are individually formed, overlaid and integrated may be used.

DESCRIPTION OF REFERENCE SYMBOLS 1, 1A, 1B, 1C: TOUCH INPUT DEVICE,
10: TOUCH PANEL,
10P: PIEZOELECTRIC SENSOR,
10D: ELECTROSTATIC SENSOR,
200, 200B: PUSH AMOUNT CALCULATING UNIT,
210A: INTEGRATION ARITHMETIC OPERATION UNIT,
234A, 234C: DIGITAL IC,
300, 300A: TOUCH DETECTION SIGNAL GENERATING UNIT,
400: ADC (ANALOG/DIGITAL CONVERTING UNIT),
500: COMPARISON ARITHMETIC OPERATION UNIT,
U1: OPERATIONAL AMPLIFIER,
U2: COMPARATOR,
R1: RESISTOR,
C1: CAPACITOR,
R0: DISCHARGE RESISTOR,
S0: SWITCH ELEMENT,
Pout1: FIRST OUTPUT TERMINAL, AND
Pout2: SECOND OUTPUT TERMINAL

The invention claimed is:
1. A push detecting sensor comprising:
a touch panel that includes a piezoelectric sensor that outputs a push signal corresponding to a displacement amount when a surface of the touch panel is pushed;
a touch detecting sensor that outputs a touch detection signal when the surface of the touch panel is touched;

a push amount calculating circuit that integrates a difference between the push signal and a reference potential to generate a push amount detection signal; and a switching element that controls the push amount calculating unit, based on a state of the touch detection signal, to switch the push amount calculating circuit between integrating the difference between the push signal and the reference potential and resetting the reference potential, wherein the switching element controls the push amount calculating circuit to integrate the difference between the push signal and the reference potential when the state of the touch detection signal indicates an operation state in which the touch panel is being touched, and wherein the switching element controls the push amount calculating circuit to reset the reference potential when the state of the touch detection signal switches to an untouched state of the touch panel to stabilize the reference potential.

2. The push detecting sensor according to claim 1, wherein the touch detecting sensor is configured to output the touch detection signal as a binary value based on a state of whether the surface of the touch panel is touched or not touched.

3. The push detecting sensor according to claim 2, wherein the push amount calculating circuit integrates the difference between the push signal and the reference potential according to a first binary value and resets the reference potential according to a second binary value.

4. The push detecting sensor according to claim 3, wherein the push amount calculating circuit comprises an integration circuit with a bypass circuit that is enabled in response to the first binary value and disenabled in response to the second binary value.

5. The push detecting sensor according to claim 4, wherein the push amount calculating circuit comprises:
a first operational amplifier having an inversion input terminal that receives the push signal and a non-inversion input terminal coupled to the reference potential;
a capacitor connected in parallel between an output terminal of the first operational amplifier and the inversion input terminal of the first operational amplifier; and
a series circuit that is connected in parallel to the capacitor and that includes a discharge resistor and the switching element that turns on and off according to the first and second binary values, respectively.

6. The push detecting sensor according to claim 5, wherein the push amount calculating circuit further comprises a second operational amplifier having an inversion input terminal coupled to an output of the first operational amplifier and a non-inversion input terminal coupled to another reference potential.

7. The push detecting sensor according to claim 1, wherein the push amount calculating circuit comprises:
a first operational amplifier having an inversion input terminal that receives the push signal and a non-inversion input terminal coupled to the reference potential;
a capacitor connected in parallel between an output terminal of the first operational amplifier and the inversion input terminal of the first operational amplifier; and
a series circuit that is connected in parallel to the capacitor and that includes a discharge resistor and the switching element that turns on and off according to the touch detection signal.

8. The push detecting sensor according to claim 7, wherein the push amount calculating circuit further comprises a second operational amplifier having an inversion input terminal coupled to an output of the first operational amplifier and a non-inversion input terminal coupled to another reference potential.

9. The push detecting sensor according to claim 1, wherein the touch detecting sensor comprises:
an electrostatic sensor that outputs a touch signal when an electrostatic capacitance changes when the surface of the touch panel is touched; and
a touch detection signal generating unit that generates the touch detection signal based on the touch signal output from the electrostatic sensor.

10. The push detecting sensor according to claim 9, wherein the push amount calculating circuit and the touch detection signal generating unit are collectively integrated in a digital IC integrated as one chip.

11. The push detecting sensor according to claim 9, wherein the electrostatic sensor is disposed in the touch panel.

12. A touch input device comprising:
a push detecting sensor that includes:
a touch panel that includes a piezoelectric sensor that outputs a push signal corresponding to a displacement amount when a surface of the touch panel is pushed;
a touch detecting sensor that outputs a touch detection signal when the surface of the touch panel is touched;
a push amount calculating circuit that is coupled to the touch detecting sensor and receives the touch detection signal; and
a switching element that controls the push amount calculating unit, based on a state of the touch detection signal, to switch between integrating a difference between the push signal and a reference potential to generate a push amount detection signal and resetting the reference potential,
wherein the switching element controls the push amount calculating circuit to integrate the difference between the push signal and the reference potential when the state of the touch detection signal indicates an operation state in which the touch panel is being touched, and
wherein the switching element controls the push amount calculating circuit to reset the reference potential when the state of the touch detection signal switches to an untouched state of the touch panel to stabilize the reference potential,
wherein the touch input device is configured to output the touch detection signal together with the push amount detection signal.

13. The touch input device according to claim 12, wherein the push amount calculating circuit includes a signal output selecting unit that is configured to stop an output of the touch detection signal when the push amount detection signal is below a threshold, and to enable an output of the touch detection signal when the push amount detection signal is equal to or above the threshold.

14. The touch input device according to claim 12, wherein the touch detecting sensor includes:
an electrostatic sensor that outputs the touch signal when an electrostatic capacitance changes when the surface of the touch panel is touched; and a touch detection signal generating unit that generates the touch detection signal based on the touch detection signal output from the electrostatic sensor.

15. The touch input device according to claim 14, wherein the push amount calculating unit and the touch detection signal generating unit are collectively integrated in a digital IC integrated as one chip.

16. The touch input device according to claim 14, wherein the piezoelectric sensor and the electrostatic sensor collectively include:
 a piezoelectric film of a flat film shape that includes a primary surface and a secondary surface opposing the primary surface;
 an electrostatic capacitance detection electrode that is disposed in at least one of the primary surface and the secondary surface of the piezoelectric film; and
 a piezoelectric voltage detection electrode that is disposed in the primary surface and the secondary surface of the piezoelectric film.

17. The touch input device according to claim 16, wherein the piezoelectric film comprises polylactic acid that is stretched in at least a uniaxial direction.

18. The touch input device according to claim 12, wherein the push amount calculating circuit comprises:
 a first operational amplifier having an inversion input terminal that receives the push signal and a non-inversion input terminal coupled to the reference potential;
 a capacitor connected in parallel between an output terminal of the first operational amplifier and the inversion input terminal of the first operational amplifier; and
 a series circuit that is connected in parallel to the capacitor and that includes a discharge resistor and the switching element that turns on and off according to the touch detection signal.

19. The touch input device according to claim 18, wherein the push amount calculating circuit further comprises a second operational amplifier having an inversion input terminal coupled to an output of the first operational amplifier and a non-inversion input terminal coupled to another reference potential.

* * * * *